United States Patent Office 3,487,054
Patented Dec. 30, 1969

3,487,054
SULFUR VULCANIZABLE ACRYLATE-CYCLIC DIENE ELASTOMERS
Harold E. Minnerly, Jr., Rocky River, and August H. Jorgensen, Jr., Avon Lake, Ohio, assignors to The B. F. Goodrich Company, New York, N.Y., a corporation of New York
No Drawing. Filed July 1, 1966, Ser. No. 562,090
Int. Cl. C08f 17/00
U.S. Cl. 260—79.5         7 Claims

ABSTRACT OF THE DISCLOSURE

Sulfur vulcanizable elastomers of acrylic acid esters are provided by copolymerizing with an acrylic acid ester less than 10 percent of methylcyclopentadiene, and the dimer of methylcyclopentadiene.

---

This invention relates to vulcanizable acrylic acid ester elastomers and relates more particularly to sulfur vulcanizable elastomers of alkyl esters of acrylic acid copolymerized with minor proportions of cyclopentadiene derivatives.

Elastomers or rubbers of alkyl esters of acrylic acid, particularly poly(ethyl acrylate) are well known. Because of certain outstanding physical properties of these polymers as heat, light, ozone and oil resistance, particularly in a cured or vulcanized state, improved ways of vulcanizing poly(ethyl acrylate) have been needed. Poly(ethyl acrylate) was first cross-linked with alkaline materials as sodium metasilicate, and later, copolymers of ethyl acrylate and such monomers as chloroethyl acrylate and chloroethyl vinyl ether were copolymerized with ethyl acrylate to provide elastomers which can be vulcanized with amines as triamine base. Another approach to obtain readily vulcanizable rubbers was through the addition of small amounts of butadiene or isoprene to introduce unsaturation in the polymer chain which would be a site of cross-linking or curing. This later approach never became commercially successful so that there is still a need for ethyl acrylate elastomers which are readily vulcanized in sufur systems which provides versatility in compounding, and the elimination of odoriferous vulcanization systems whch often limit the utility of the vulcanized product. Among the many monomers copolymerized with ethyl acrylate to provide unsaturation in the polymer chain was cyclopentadiene, reported in the articles "Preparation and Vulcanization of Unsaturated Acrylic Elastomers"—I, India Rubber World, February 1941, pages 596-598 and "Preparation and Vulcanization of Unsaturated Acrylic Elastomers"—II, India Rubber World, March 1949, pages 727–730, both by W. C. Mast and C. H. Fisher. Sulfur compound vulcanizates of the cyclopentadiene copolymers showed maximum tensile strengths of only 490 p.s.i. with an ultimate elongation of 1540%, which indicates only minimum vulcanization or cross-linking.

We have now found quite unexpectedly, and contrary to the experience of those skilled in the art in this field, that when dicyclopentadiene, methyl cyclopentadiene and the dimer of methyl cyclopentadiene are copolymerized with alkyl esters of acrylic acid wherein the alkyl group contains 1 to 4 carbon atoms, in amount less than 10 mol percent of diene, that sulfur-curable copolymers are obtained which are readily vulcanized in standard sulfur recipes to give vulcanizates with improved tensile strengths and a good balance of other desirable physical properties.

While it is believed that the improved results obtained with these copolymers is a consequence of the unsaturation available for cross-linking or vulcanization not being in the polymer backbone, it is not understood why cyclopentadiene is so inferior, as compared to the cyclopentadiene dimer and methyl cyclopentadiene. Further, copolymers of ethyl acrylate containing 3 mol percent cyclooctadiene are not sulfur curable. Regardless of the reason, the improved and useful copolymers of this invention allow versatility in selection of compounding recipes and variations therein to provide products with a useful balance of desirable physical properties.

The polymers may be vulcanized with sulfur and conventional accelerators or by the resin systems used in curing butyl rubber.

The alkyl esters of acrylic acid useful in this invention are those wherein the alkyl radical contains 1 to 4 carbon atoms including methyl, ethyl, propyl, isopropyl, butyl, isobutyl, beta-cyanoethyl, cyanopropyl, cyanobutyl and combinations thereof. The amount of alkyl acrylate ester used will be greater than 50 mol percent and in the case of copolymers will be greater than 90 mol percent.

The monomers used to provide unsaturation in the polymers are dicyclopentadiene, methyl cyclopentadiene and the dimer thereof, present both in monomer mixtures for polymerization and in the copolymer product in amounts less than 10 mol percent. More preferably from about 1 to about 5 mol percent, with particularly useful materials being obtained when these components are present in amount from about 2 to 4 mol percent.

Other comonomers may be copolymerized with the alkyl acrylate ester and diene constituent so long as the amount used is less than about 40 mol percent and more preferably less than about 25 mol percent to about one percent. Such other copolymerizable monomers include the vinylidene compounds having a terminal $H_2C<$ group. These include the vinyl monomers ecrylonitrile, methacrylonitrile, the styrenes as styrene, alpha methyl styrene, vinyl toluene, chlorostyrene, nitrostyrene, vinyl chloride, vinylidene chloride, vinyl acetate, alkyl vinyl ethers, alkyl vinyl ketones, acrylic acid, methacryic acid, methyl methacrylate, ethyl methacrylate, octyl methacrylate, methyl ethacrylate, acrylamide, methacrylamide, N-methylol acrylamide, octyl acrylate, alkyl fumarates and the like; and while not required, since adequate vulcanization is obtained with the diene components of this invention, chloroethyl vinyl ether, chloroethyl acrylate, and the like. Particularly useful is 5 to 10 parts of acrylonitrile.

The copolymers of the invention are readily prepared by polymerization under the influence of heat, ultra-violet light and free-radical generating catalysts, in bulk, solution or aqueous emulsion.

The preferred method for preparing such copolymers is in aqueous emulsion at a temperature in the range of 5° C. to 95° C. with emulsifying or dispersing agents which are well known to those skilled in the art and in the presence of peroxygen free-radical initiators including for example potassium persulfate and benzoyl peroxide, the so-called redox catalysts employing an organic hydroperoxide and a reducing agent, the azonitrile catalysts and the like. Polymerization techniques for preparing alkyl acrylate ester rubbers are well known and need not be detailed here. The polymers may be used in latex form or isolated as by coagulation, washed and dried for dry rubber application. Cements may be prepared by polymerization in a solvent or dissolving the dry polymer in a solvent. The usual antioxidants and stabilizers may be added to the rubber in latex state, milled or in cements. Aryl phenols are preferred as they are non-staining, but aryl amines may be used.

The novel polymers of this invention are compounded so that they may be vulcanized by heating with the usual compounding ingredients. The vulcanizing or curing agents are free sulfur preferably and/or sulfur releasing compounds. Accelerators are also employed which can be any of those known to the art, for example, tetramethylthiuram disulfide, selinium diethyldithiocarbonate, 2-mercaptobenzothiazole, benzothiazyldisulfide, and the like. Zinc oxide and other metal oxides normally used are also effective compounding ingredients. Small amounts of fatty acids such as stearic acid may be included. Age resistors and antioxidants of the known type such as octylated diphenylamines, styrenated phenols, polyalkyl polyphenols, PBNA, and others may be used. Also useful for special compounds are plasticizers, softeners, and tackifiers; and reinforcing pigments, for example, the various carbon blacks, both channel and furnace, inert fillers and diluents, all may be used as will be understood by those skilled in the compounding art.

EXAMPLES

Four copolymers of ethyl acrylate with (1) dicyclopentadiene (2) methyl cyclopentadiene and (3) di(methyl cyclopentadiene) were prepared according to the following recipe:

|  | 1 | 2 | 3 | 4 |
|---|---|---|---|---|
|  | (Parts) | | | |
| Water | 100 | 100 | 100 | 100 |
| Sodium dodecylbenzene sulfonate | 2.0 | 2.0 | 2.0 | 2.0 |
| Sodium naphthalene sulfonate | 1.0 | 1.0 | 1.0 | 1.0 |
| $Na_4P_2O_7$ | 0.5 | 0.5 | 0.5 | 0.5 |
| $Na_2S_2O_4$ | 0.02 | 0.02 | 0.02 | 0.02 |
| Tetrasodium salt of ethylene diamine tetraacetic acid | 0.025 | 0.025 | 0.025 | 0.025 |
| Sodium-ferric salt of ethylene diamine tetraacetic acid | 0.015 | 0.015 | 0.015 | 0.015 |
| Sodium formaldehyde sulfoxylate | 0.0 | 0.07 | 0.07 | 0.07 |
| P-methane hydroperoxide | 0.07 | 0.07 | 0.07 | 0.07 |
| Ethyl acrylate | 96.08 | 97.52 | 97.0 | 97.0 |
| Dicyclopentadiene | 3.92 | | | |
| Methyl cyclopentadiene | | 2.48 | | |
| Methyl cyclopentadiene dimer | | | 3.0 | |
| 1,5-cyclooctadiene | | | | 3.0 |
| Temperature, °C | 24-28 | 23-30 | 20-28 | 20-32 |
| pH | 8.3 | 8.5 | 8.45 | 6.95 |
| Percent total solids | 45.7 | 46.1 | 45.1 | 46.9 |
| Percent conversion | 89.5 | 90.3 | 88.4 | 92.0 |

The monomers were premixed and emulsified in one-half of the water and all of the sulfonate $AA_{10}$. This emulsion was proportioned to the mixture of the other ingredients dissolved in the other one half of the water, under agitation, over a 2 hour period. The polymer was isolated from the latex by the addition of a solution of calcium chloride, washed and dried. 1 had a 4 minute large rotor Mooney value at 212° F. of 46, and 2, 39.

The copolymers of Examples 1 and 2 were compounded to the following receipe: Polymer 100, FEF black 65, stearic acid 1, zinc oxide 5, sulfur 2 and dipentamethylene thiuramtetrasulfide 2. Portions of the compound were vulcanized at 347° F. for 5, 10 and 20 minutes. The following stress strain properties were obtained on the resulting vulcanizates.

|  | Dicyclopentadiene Copolymer (1) | Methyl cyclo pentadiene Copolymer (2) |
|---|---|---|
| 100% Modulus: | | |
| 5 minutes | 460 | 400 |
| 10 minutes | 640 | 460 |
| 20 minutes | 850 | 580 |
| Tensile Strength, p.s.i.: | | |
| 5 minutes | 1,350 | 950 |
| 10 minutes | 1,700 | 1,150 |
| 20 minutes | 1,850 | 1,350 |
| Elongation, Percent: | | |
| 5 minutes | 370 | 380 |
| 10 minutes | 280 | 350 |
| 20 minutes | 230 | 280 |
| Durometer A Hardness: | | |
| 5 minutes | 78 | 80 |
| 10 minutes | 77 | 79 |
| 20 minutes | 82 | 80 |

In another series of compounds using 5 parts of zinc oxide, 0.5 part of 2-mercaptobenzothiazole, 1.5 parts of tetramethylthiuram monosulfide, 65 parts of Philblack A (FEF Black), 1 part of stearic acid and 1.5 parts sulfur, cured at 347° F., the dicyclopentadiene copolymer had a 10 minute modulus of 1040 p.s.i. at 100% elongation and a tensile strength of 1900 p.s.i., a scorch time at 275° F. of 14.3 and a cure time of 21.5. This material passed a 180° bend test after 70 hours at 347° F. in an air test tube. When the copolymer (3) of the dimer of methyl cyclopentadiene was compounded in a similar recipe it had a scorch time of 20.5 and a cure time of 27.5 and the resulting vulcanizates had good tensile strength values. When the copolymer (4) of 1,5-cyclooctadiene was compounded in this recipe and heated at 347° F. no cure was obtained.

100 parts of the copolymer 3, the copolymer of the dimer of methyl cyclopentadiene was mixed with 65 parts of FEF black, 1 part of stearic acid, 12 parts of dimethylol phenol resin (Catalin 9273) and 2 parts of stannous chloride. The mixture was cured at 347° F. for 5, 10 and 20 minutes and the 100% modulus and tensile strength were—

|  | Modulus, p.s.i. | Tensile Strength, p.s.i. |
|---|---|---|
| 5 minutes | 1,020 | 2,000 |
| 10 minutes | 1,270 | 1,950 |
| 20 minutes | 1,400 | 2,100 |

The vulcanizates passed the 180° bend test after 70 hours at 300° F. in ASTM #4 oil.

The vulcanized elastomers of this invention find many applications where heat and oil resistance are required. For example, oil hose, gaskets, O-rings, transmission seals, belting, tank linings, as curable cements and for latex treatment of fibrous materials.

We claim:

1. An interpolymer consisting of greater than 50 mol percent of an alkyl ester of acrylic acid wherein the alkyl group contains 1 to 4 carbon atoms, less than 40 mol percent of copolymerizable vinylidene compounds having one terminal $H_2C<$ group, and less than 10 mol percent of a diene selected from the group consisting of methyl cyclopentadiene and the dimer of methyl cyclopentadiene.

2. An interpolymer of claim 1 wherein the alkyl ester of acrylic acid is ethyl acrylate present in amount greater than 90 mol percent with 1 to 5 mol percent methyl cyclopentadiene.

3. An interpolymer of claim 1 wherein the alkyl ester of acrylic acid is ethyl acrylate present in amount greater than 90 mol percent with 1 to 5 mol percent of methyl cyclopentadiene dimer.

4. An interpolymer of claim 1 wherein acrylonitrile is present in amount of about 5 to 10 mol percent.

5. An interpolymer of claim 1 wherein the diene is present in amount of about 2 to 4 mol percent.

6. A vulcanizate of an interpolymer of claim 1.

7. An interpolymer of claim 1 containing sulfur and heated to a vulcanized state.

References Cited

UNITED STATES PATENTS

| 2,643,247 | 6/1953 | Fisher et al. | 260—79.5 |
| 2,689,232 | 9/1954 | Gerhart | 260—23.7 |
| 3,402,158 | 9/1968 | Santaniello et al. | 260—80.81 |

JOSEPH L. SCHOFER, Primary Examiner

S. M. LEVIN, Assistant Examiner

U.S. Cl. X.R.

260—23.7, 66, 78.5, 80.7, 80.73, 80.76, 80.78, 80.81, 80.8, 83.5, 86.1, 89.5